US005617773A

United States Patent [19]

Craft et al.

[11] Patent Number: 5,617,773

[45] Date of Patent: Apr. 8, 1997

[54] LINER FOR USE IN CORROSIVE AND ABRASIVE FLUID PUMP AND METHOD OF MAKING SAME

[76] Inventors: Alan Craft, 602 Saddlewood, Houston, Tex. 77024; Charles Mabry, 4985 Littlewood Dr., Beaumont, Tex. 77706

[21] Appl. No.: 553,142

[22] Filed: Nov. 7, 1995

[51] Int. Cl.[6] .......... F16J 10/04

[52] U.S. Cl. .......... 92/171.1; 29/888.061

[58] Field of Search .......... 92/171.1, 169.1, 92/169.4; 29/888.061; 164/9, 11, 98, 112, 132

[56] References Cited

U.S. PATENT DOCUMENTS

| | | | |
|---|---|---|---|
| 1,528,947 | 3/1925 | Preston | 29/888.061 X |
| 1,730,905 | 10/1929 | Thomas et al. | 92/171.1 |
| 2,176,773 | 10/1939 | Sparkes | 29/888.061 |
| 2,282,502 | 5/1942 | Suth | 92/171.1 |
| 2,387,971 | 10/1945 | Aspin et al. | 29/888.061 X |
| 3,069,209 | 12/1962 | Bauer | 92/169.1 |
| 3,073,290 | 1/1963 | Stump | 29/888.061 X |
| 3,439,586 | 4/1969 | Holtan et al. | 29/888.061 X |
| 3,749,072 | 7/1973 | Schweikher | 92/169.1 X |
| 3,792,518 | 2/1974 | Cross et al. | 20/888.061 |
| 4,003,422 | 1/1977 | Schramm et al. | 164/9 |
| 4,318,437 | 3/1982 | Kemp | 164/7.2 |
| 4,486,938 | 12/1984 | Hext | 29/402.06 |
| 4,516,479 | 5/1985 | Vadasz | 92/171.1 X |
| 4,524,498 | 6/1985 | Hartsock | 92/212 X |
| 4,568,393 | 2/1986 | Kane et al. | 148/220 |
| 4,715,313 | 12/1987 | Ecer | 118/105 |
| 4,719,844 | 1/1988 | Dugan | 92/225 X |

FOREIGN PATENT DOCUMENTS

| | | | |
|---|---|---|---|
| 817303 | 3/1981 | U.S.S.R. | 92/169.1 |
| 329625 | 5/1930 | United Kingdom | 92/169.1 |

*Primary Examiner*—F. Daniel Lopez

*Attorney, Agent, or Firm*—Gordon T. Arnold; William R. Beard

[57] ABSTRACT

The present invention addresses the need for a liner with a hard inner surface and a machinable outer surface for use in a pump for abrasive or corrosive materials. According to one embodiment, the present invention provides technical advantages not previously seen in a corrosive or abrasive fluid pump liner comprising a cylindrical sleeve and a cylindrical shell around the sleeve, the shell comprising iron.

26 Claims, 5 Drawing Sheets

X : Y ≈ 1 : 3

LINER FOR USE IN CORROSIVE AND ABRASIVE FLUID PUMP AND METHOD OF MAKING SAME

BACKGROUND OF THE INVENTION

In certain applications, corrosive or abrasive fluids (for example, oil well drilling fluid, commonly known as "mud") must be pumped. Many of the pumps used for this application have special liners through which the mud is pumped, and, after being used for some time, the liner wears and needs to be replaced. Unfortunately, the liner must serve many purposes. First, the liner must be hard to resist the abrasive nature of the fluids that move through the liner. Second, the liner must be machinable to fit the close tolerances required of the pumps. Hard, abrasive-resistant materials are not very machinable. Also, the pressures and forces that act on the liner are extreme, and the liner can be very large. Therefore, there is a desire to use inexpensive materials in the construction of the liner. Unfortunately, most inexpensive materials are not abrasive or corrosive-resistant.

Attempts to address these issues have been made, but industry has settled on a dual-metal liner having an abrasive and corrosive-resistant inner surface and a machinable outer surface. One such liner is centrifugally cast, wherein a carbon steel outer shell is cast in a spinning mold, and a high-chrome steel is then poured into the interior of a hot outer shell. Upon cooling, the result is a metallurgical bond between the inner sleeve and outer shell, and the liner has a hard inner surface and a machinable outer surface. However, critical spinning speeds, pour temperatures, and other parameters, make such a liner and process very expensive and difficult to make.

Another method of making the liner is to shrink fit, wherein the carbon steel shell is heated and the high-chrome sleeve is cooled. The two are then press-fit together. Upon reaching a common temperature, the sleeve has expanded and the shell has shrunk, thus creating a tight fit. However, there is no metallurgical seal between the two.

Attempts have been made at static casting the steel shell and the sleeve. However, this method was abandoned as a failure, because the brittle sleeve would crack.

Thus, there is a need for a liner that is inexpensive, corrosive-resistant, and abrasive-resistant on the inner surface, while being machinable on the outer surface. Also, there is a need for an inexpensive method of making such a liner.

SUMMARY OF THE INVENTION

According to one embodiment of the invention, the above problems are addressed in a corrosive or abrasive fluid pump liner comprising: a cylindrical sleeve and a cylindrical shell around the sleeve, the shell comprising iron. According to a further embodiment, a method of making a corrosive or abrasive fluid pump liner having a sleeve and a shell is provided, the method comprising: placing the sleeve in a mold for the shell and inserting iron into the mold.

According to still a further embodiment, there is provided a method of making a corrosive or abrasive fluid pump liner having a sleeve and a shell comprising: cooling the sleeve, heating the shell, the shell comprising iron, inserting the sleeve in the shell, and bringing the temperature of the shell and the sleeve to a common level.

DESCRIPTION OF THE DRAWINGS

For a more complete understanding of the present invention and for further advantages thereof, reference is made to the following Detailed Description of Example Embodiments taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DETAILED DESCRIPTION OF EXAMPLE EMBODIMENTS

Figure 1:
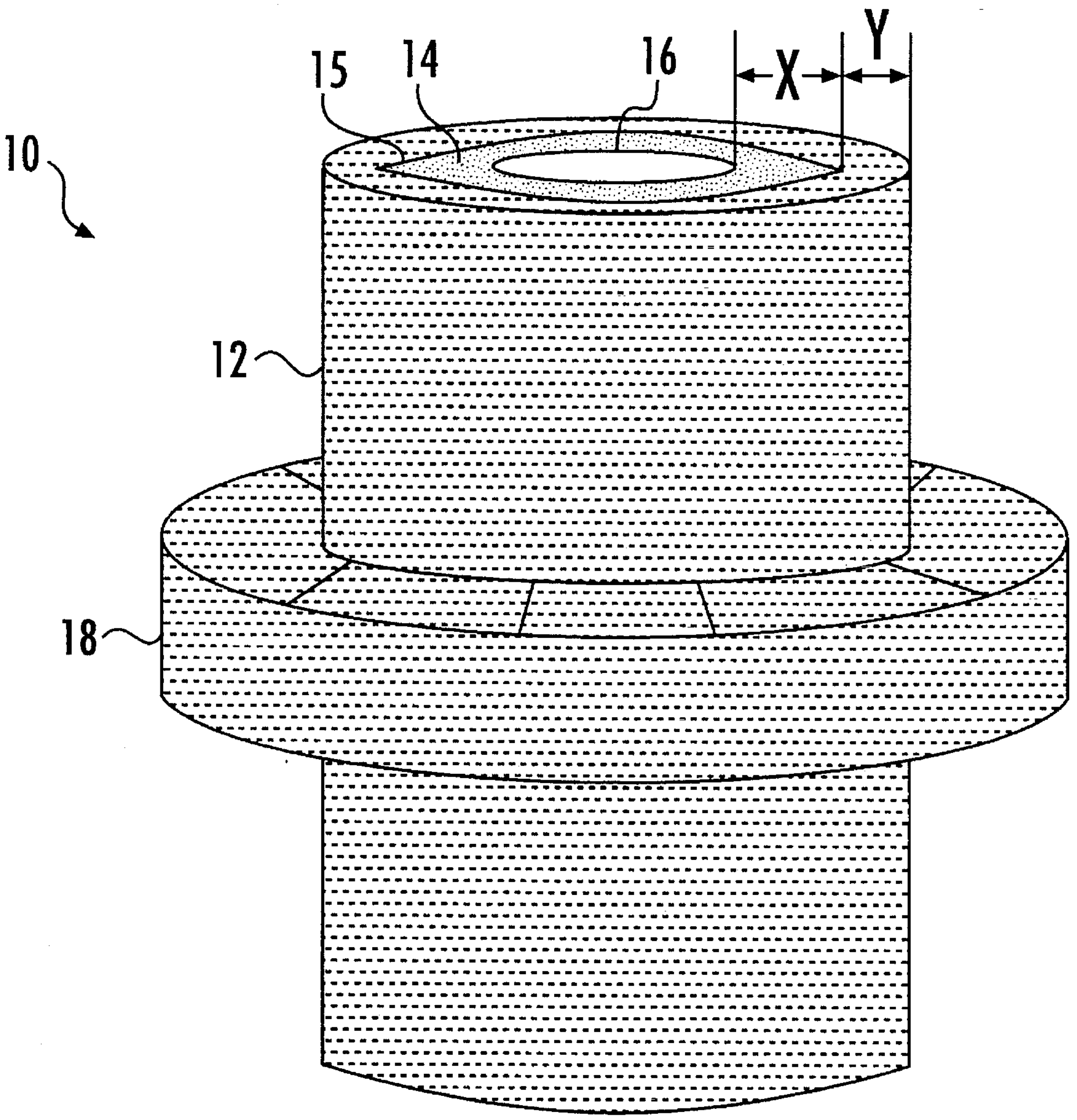
FIG. 1 is a perspective view of an embodiment of the invention.

Referring to FIG. 1, a corrosive or abrasive fluid pump liner 10 is shown comprising a cylindrical sleeve 14 and a cylindrical shell 12 around the sleeve 14, the shell 12 comprising iron. In this example, the ratio of the wall thickness X of the sleeve 14 to the wall thickness Y of the shell 12 is about ⅓, the sleeve 14 having a wall thickness of about ⅞ inches and the shell 12 having a wall thickness of about 1 and 5/16 inches. A shell wall thickness of 7/16, or less, is appropriate for some embodiments. Also in the illustrated embodiment, bore 16 has a diameter of about 6 and ½ inches. It should be noted, however, that corrosive or abrasive fluid pump liners according to the present invention are provided in varying sizes, wall thicknesses, and bore sizes, to fit a variety of pumps. The presently disclosed specific numbers, however, have been found to be appropriate for casting an iron shell (for example, ASTM No. 536 iron) around a high-chrome sleeve (for example, ASTM No. A532) without cracking the sleeve 14.

As noted above, according to one example embodiment of the present invention, the iron in shell 12 comprises ductile iron, which is a machinable metal having a pouring temperature between about 1300° C. and about 1315° C.

Figure 3:
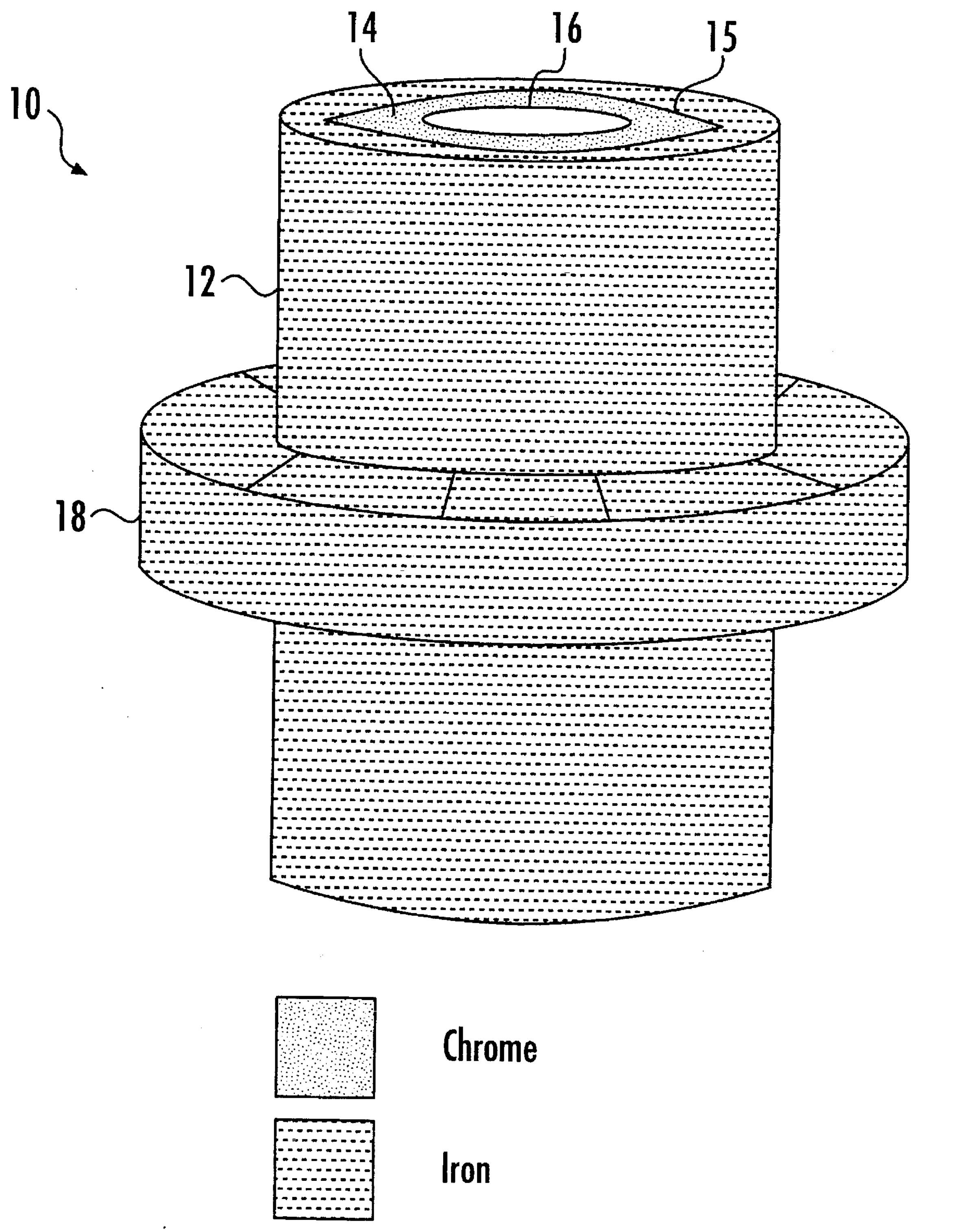
FIG. 3 is a perspective view of an embodiment of the invention comprising a chrome sleeve.

Also seen in the FIG. 1 embodiment is a flange 18 around the sleeve 14. In alternative embodiments, no flange is used. However, in embodiments using a flange 18, the flange 18 is acceptably attached in a number of manners. For example, according to one example, flange 18 is welded (weld 9 is shown in FIG. 3) to the sleeve 14, although welding is a weak joining method that may be unacceptable for some applications of the present invention. In an alternative example, flange 18 is integrally formed with the sleeve 14 (for example, by casting as shown by cast joint 8 in FIG. 4). Also seen in FIG. 1 is a seal 15 between sleeve 14 and shell 12, to prevent fluid flow between sleeve 14 and shell 12. According to one embodiment, seal 15 comprises a v-shaped neoprene seal in a groove machined in the shell 12. Alternatively, seal 15 comprises weld metal. Even further, as an alternative, seal 15 comprises a lip of shell 12, cast integrally around sleeve 14.

Figure 4:
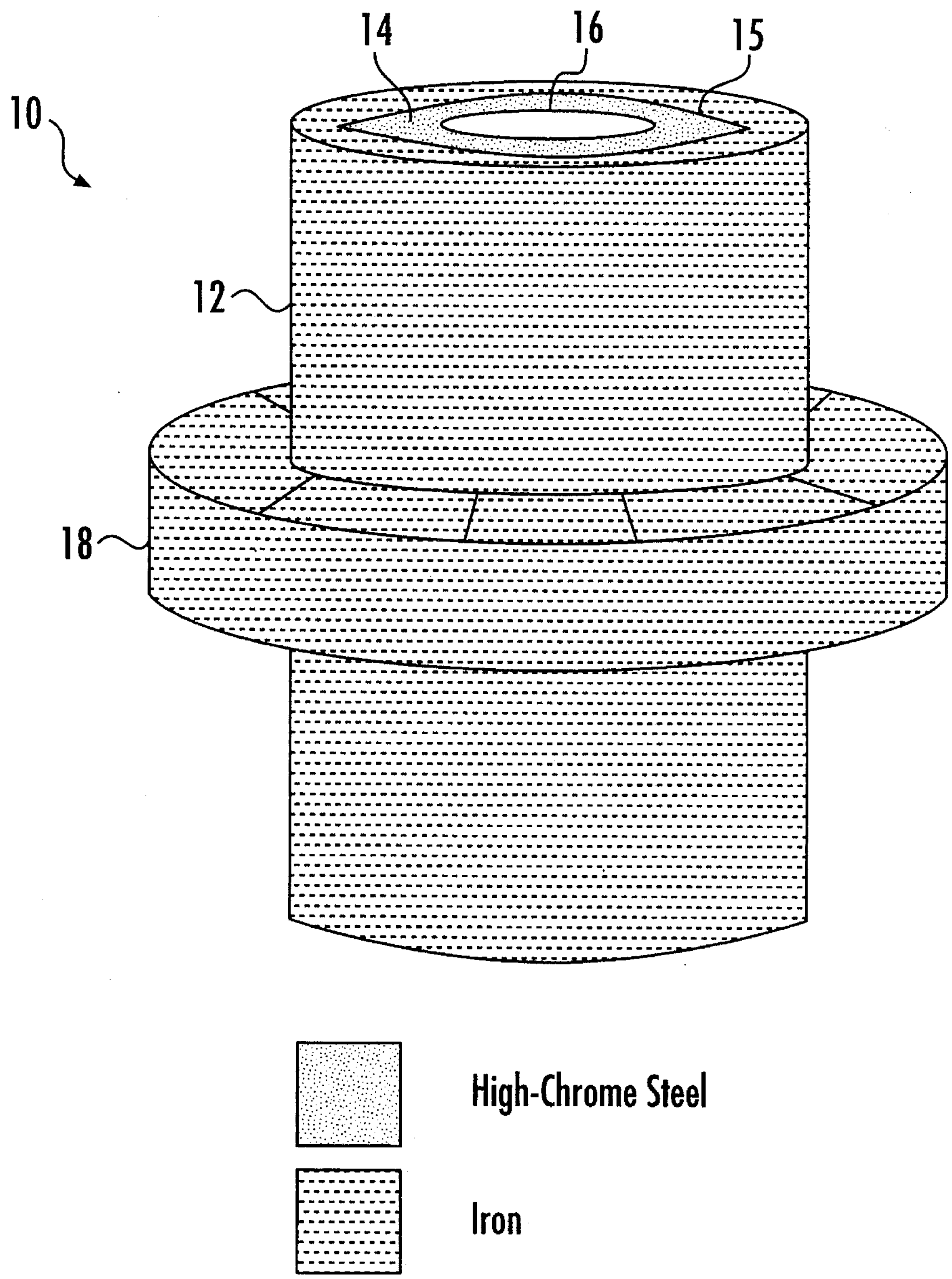
FIG. 4 is a perspective view of an embodiment of the invention comprising a high-chrome steel sleeve.
Figure 5:
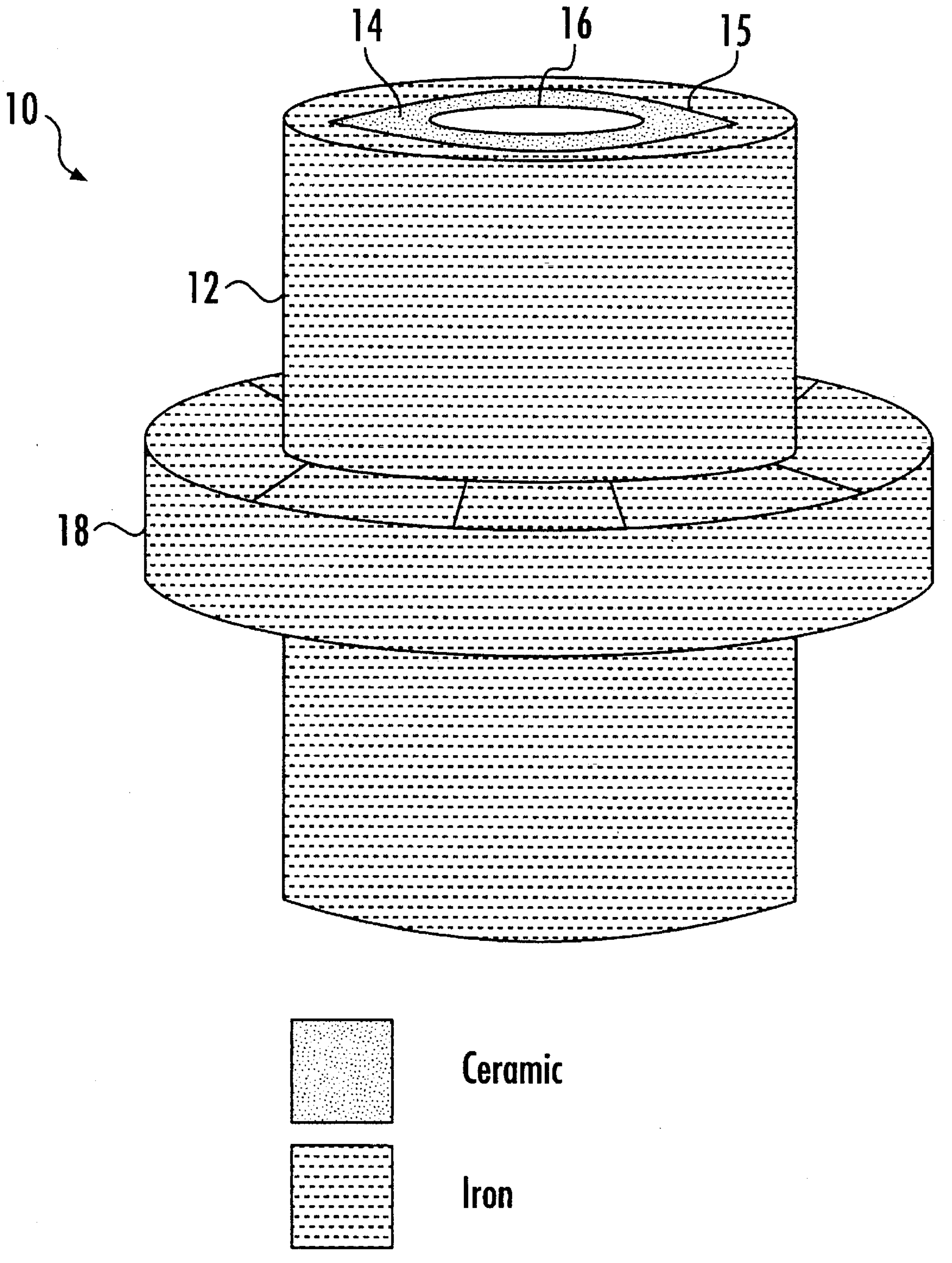
FIG. 5 is a perspective view of an embodiment of the invention comprising a ceramic sleeve.

As noted above, one acceptable material for sleeve 14 comprises ASTM No. 532 metal or iron, which is an example of a corrosive-resistant and abrasive-resistant material useful in a corrosive or abrasive fluid pump, which must by its nature come into contact with corrosive and abrasive mud. Other corrosion-resistant or abrasion-resistant materials are also acceptable. As shown in FIGS. 3–5 for example, chrome, a high-chrome steel (i.e., ASTM No. A597) and certain ceramics are useful alternative embodiments. For example, a 94% purity industrial ceramic is acceptable according to another embodiment.

Figure 2:
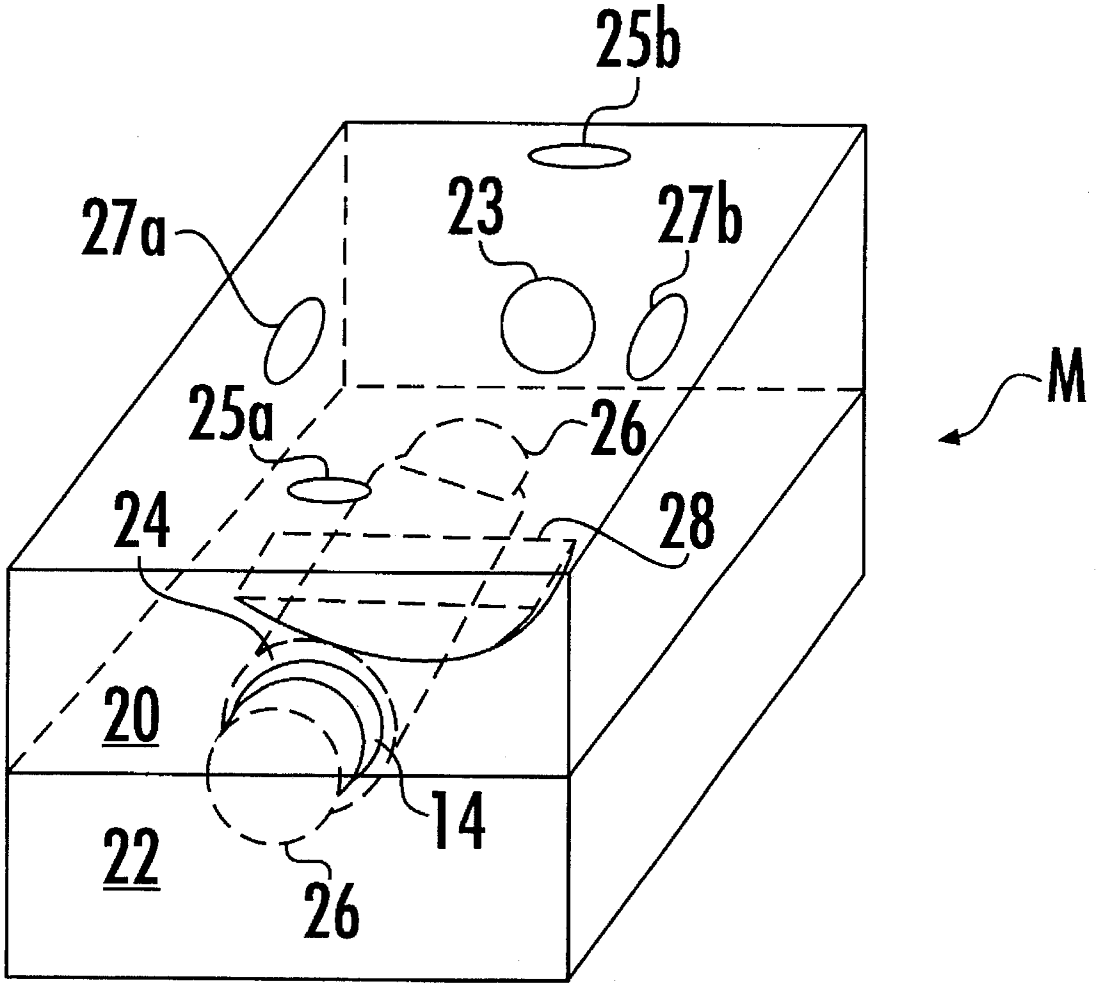
FIG. 2 is a perspective view of a mold useful according to an embodiment of the invention.

Referring now to FIG. 2, a method of making a mud pump liner will be described. In this embodiment, mold M (comprising cope 20 and a drag 22) is made from a Furan sand process, as is understood by those of skill in the art. According to alternative embodiments, mold M is formed according to other chemically-bonded sand processes (e.g., a Pepset process) or green sand processes, all of which are known to those of skill in the art. Other molding processes will occur to those skilled in the art that are within the spirit of the present invention.

As seen in the FIG. 2 embodiment, sleeve 14 is used in the mold M as a core for the shell, which will occupy void 24. Also seen is an inner core 26 for closing the ends of sleeve 14. In one embodiment, a Pepset process is used for core 26. In one embodiment, core 26 is hollow, defining a bore, having an inner diameter of about 3 inches. Other methods of making core 26 will occur to those of skill in the art without departing from the spirit of the present invention.

Metal for the shell is poured through pour hole 23, which communicates with void 24 by a passage (not shown) in the cope 20. Likewise, risers **27*a* and 27*b* are provided, the risers communicating with void 28 (in which a flange is formed) through riser passages (again, not shown). Also, holes 25*a* and 25*b* are formed in cope 20 to provide an escape for gasses from core 26**.

It should be noted that in alternative embodiments (for example, where a flange 18 is not integrally cast with the shell 12) no void 28 will be used, and the position of risers **27*a* and 27*b*, as well as the position of pour hole 23 and gas holes 25*a* and 25*b*, will change according to design parameters that are known to those of skill in the art. The same is true for the use of differing materials for shell 12 and sleeve 14**, depending on different pour temperatures, size of the casting, placement of chills, and other parameters normally modified by those of skill in the art. According to one specific example, ductile iron is poured in the mold M at a temperature of between about 1300° C. and about 1315° C.

According to still a further embodiment of the invention, another method of making a corrosive or abrasive fluid pump liner 10 having a sleeve 14 and a shell 12 comprises: cooling a sleeve 14, heating an iron shell 12, inserting a sleeve 14 in the iron shell 12, and bringing the sleeve 14 and shell 12 to a common temperature of about 885° C. It should be noted that such heat treatment is performed, in another embodiment, in which the shell is statically cast around the sleeve, as described above. The cooling is accomplished according to a variety of embodiments by, for example, placing the sleeve 14 and shell 12 in ambient air and blowing air through the liner only. Many forms of cooling (i.e. quenching) are also acceptable. After the shell and sleeve are brought to a common temperature, the assembled piece is, according to one embodiment, heat treated in a gas-fired oven at a temperature of about 885° C. for about 2 hours for every inch of wall thickness (sleeve and shell combined).

It should be noted that in yet another embodiment, in which the shell is statically cast around the sleeve, as described above, a heat treatment at about 885° C. is also useful.

Other embodiments will occur to those of skill in the art, from the above example embodiments, which will not depart from the spirit of the present invention.

What is claimed is:

1. A dual-metal, fluid pump liner for lining the interior of a fluid pump housing, the liner comprising:

a corrosion and abrasion resistant sleeve having an inner surface for passage of fluid and an outer surface;

a shell comprising machinable iron and having an inner surface and an outer surface shaped for engagement with the pump housing; and a metallurgical bond between the inner surface of the shell and the outer surface of the sleeve.

2. A liner as in claim 1 wherein the iron comprises ductile iron.

3. A liner as in claim 1 wherein said shell further comprises a flange.

4. A liner as in claim 3 wherein the shell and the flange are cast.

5. A liner as in claim 1 wherein the sleeve comprises chrome.

6. A liner as in claim 5 wherein the sleeve comprises a high-chrome iron.

7. A liner as in claim 5 wherein the sleeve comprises a high-chrome steel.

8. A liner as in claim 1 wherein the shell consists essentially of iron.

9. A liner as in claim 1 wherein the shell consists essentially of ductile iron.

10. A dual-metal, fluid pump liner as in claim 1, wherein said sleeve consists essentially of steel.

11. A dual-metal, fluid pump liner for lining the interior of a fluid pump housing, the liner comprising:

a corrosion and abrasion resistant sleeve having an inner surface for passage of fluid and an outer surface;

a shell comprising iron and having an inner surface and an outer surface shaped for engagement with the pump housing; and a metallurgical bond between the inner surface of the shell and the outer surface of the sleeve, wherein the ratio of the wall thickness of the sleeve to the wall thickness of the shell about 1:3.

12. A liner as in claim 11 wherein the sleeve comprises ASTM No. A532 iron.

13. A liner as in claim 11 wherein the sleeve comprises ASTM No. A597 steel.

14. A dual-material, fluid pump liner for lining the interior of a fluid pump housing, the liner comprising:

a corrosion and abrasion resistant sleeve having an inner surface for passage of fluid and an outer surface, and a shell comprising iron and having an inner surface and an outer surface shaped for engagement with the pump housing;

wherein the outer surface of said sleeve is in positive surface-to-surface engagement of the inner surface of said shell independent of influences imposed by the pump; and wherein the ratio of the wall thickness of the sleeve to the wall thickness of the shell is about 1:3.

15. A liner as in claim 14, wherein said sleeve consists essentially of ceramic.

16. A method of making a dual-material, fluid pump liner having a corrosive and abrasive resistant sleeve and an iron shell comprising:

placing the sleeve in a mold for the shell;

inserting molten iron at a temperature between about 1300° C. and about 1315° C. between the mold and the sleeve; and controlling the temperature of the sleeve to prevent the sleeve from cracking.

17. A method as in claim 16 further comprising blocking the ends of the sleeve before the placing.

18. A method as in claim 17 wherein the blocking comprises insertion of a core in the sleeve.

19. A method as in claim 18 wherein the core comprises a sand core being hollow, defining a bore.

20. A method as in claim 19 wherein the inner diameter of the core bore is about 3 inches.

21. A method as in claim 18 further comprising heat-treating the sleeve and shell.

22. A method as in claim 16, further comprising shaping the mold so that the shell is cast with a wall thickness about three times the wall thickness of the sleeve.

23. A dual-material, fluid pump liner for lining the interior of a fluid pump housing, the liner comprising:

a corrosion and abrasion resistant sleeve having an inner surface for passage of fluid and an outer surface, and a shell comprising machinable iron and having an inner surface and an outer surface shaped for engagement with the pump housing;

wherein the outer surface of said sleeve is in positive surface-to-surface engagement of the inner surface of said shell independent of influences imposed by the pump.

24. A liner as in claim 23, wherein said shell further comprises a flange.

25. A liner as in claim 23, wherein said iron comprises ductile iron.

26. A dual-metal, fluid pump liner for lining the interior of a fluid pump housing, the liner comprising:

a high-chrome steel sleeve having an inner surface for passage of fluid. an outer surface and a uniform wall thickness wherein saia sleeve is corrosion and abrasion resistant, a shell comprising iron anti having an inner surface, an outer surface shaped for engagement with the pump housing a flange and a uniform wall thickness, wherein the iron is pourable at a temperature between about 1300° C. and about 1315° C., and a metallurgical bond between the inner surface of said shell and the outer surface of said sleeve which prevents said sleeve from slipping within said shell;

wherein a ratio of the wall thickness of the sleeve to the wall thickness of the shell is about 1:3.

* * * * *